Patented June 25, 1935

2,006,166

UNITED STATES PATENT OFFICE 2,006,166

LACQUER SOLVENT

Harry E. Hofmann, New Providence Township, Union County, N. J., and James G. Park, Brooklyn, N. Y., assignors, by mesne assignments, to Stanco, Inc., New York, N. Y., a corporation of Delaware No Drawing. Application July 9, 1932, Serial No. 621,752

9 Claims. (Cl. 134—79)

This invention relates to new and improved solvents and more particularly to solvent compositions especially suitable in the field of pyroxylin lacquers.

According to our invention we prepare as a solvent a liquid composition containing a secondary ester and a ketone. This composition may also contain a secondary or tertiary aliphatic alcohol. We have found that particularly valuable solvents may be prepared containing a secondary alkyl acetate and a methyl alkyl ketone, each containing the same number of carbon atoms in the alkyl group and in addition a secondary alkyl acetate containing one more carbon atom in the alkyl group. For example, such a solvent may be prepared containing secondary butyl acetate 30% by volume, secondary amyl acetate 30% by volume, and methyl butyl ketone 40% by volume. This composition has a boiling range, evaporation rate and solvent power which are substantially equal to the corresponding characteristics of normal butyl acetate, considered by many to be the ideal lacquer solvent. These characteristics also render the composition superior to any of its separate ingredients as a lacquer solvent.

The proportions of the ingredients used in the above solvent are subject to wide variation. If the solvent is to be used for lacquer compositions, the proportions used are adjusted with regard to the desired evaporation rate and solvent power of the solvent for pyroxylin or other cellulose ester and the gums, resins, plasticizers and other ingredients used in the preparation of lacquers. For example, a suitable composition for this use may contain from 20 to 40% secondary butyl acetate, 20 to 40% secondary amyl acetate and 25 to 50% methyl butyl ketone.

A similar composition possessing a lower evaporation rate may be prepared with secondary amyl acetate, secondary hexyl acetate and methyl amyl ketone.

Solvents of higher evaporation rate may be prepared with methyl ethyl ketone and isopropyl acetate. Secondary and tertiary aliphatic alcohols containing not more than 6 carbon atoms such as isopropanol, tertiary butyl alcohol and secondary amyl alcohol may also be added to these compositions in concentrations of preferably about 10 to 25% by volume of alcohol.

These compositions may be prepared almost entirely from petroleum oils thus rendering available a substantially unlimited source of lacquer solvents of the highest quality. For example, the secondary acetates may be prepared from secondary alcohols which are readily obtained by hydration of olefines occurring in cracked petroleum products. The methyl alkyl ketones may be prepared by "cracking" or dehydrogenation of the same secondary alcohols.

The following example is an illustration of the use of a solvent of the class described herein in the preparation of a clear pyroxylin lacquer.

| Components | Parts by weight |
|---|---|
| Low viscosity nitrocellulose (30% denatured alcohol) | 15 |
| Ester gum | 10 |
| Dibutyl phthalate | 5 |
| Toluene | 42 |
| Solvent | |
| 30% secondary butyl acetate | |
| 30% secondary amyl acetate | 21 |
| 40% methyl butyl ketone | |

A similar lacquer may be prepared by adding seven parts of isopropanol to the above solvent. Other suitable hydrocarbon mixtures may be used instead of toluene. For example, hydroformed solvents of suitable boiling range prepared by destructive hydrogenation of petroleum distillate oils at elevated pressures and temperatures may be used.

Generally, in preparing lacquer solvents with secondary alkyl esters and methyl alkyl ketones it is preferred that the alkyl radical shall contain not more than 6 carbon atoms, the acid radical not more than 5 carbon atoms and each compound not more than a total of 8 carbon atoms, thereby insuring a solvent of satisfactory volatility characteristics for lacquer use.

Such solvents shall contain about 25 to 50% of the ketone and 75 to 50% of the secondary ester, based on the total amount of both constituents present. When a secondary or tertiary alcohol is added to the solvent, it should contain about 25 to 50% of the ketone, 65 to 25% of the secondary ester, and 10 to 25% of the alcohol.

The ketones may be represented by the formula $CH_3COR$ in which R is an alkyl radical containing 2 to 6 carbon atoms. The secondary acetate may be represented by the formula $CH_3COOR$ in which R is a secondary alkyl radical containing not more than 6 carbon atoms.

This invention is not to be limited to any theory regarding the characteristics of our improved solvents or to any examples which have been given solely for purpose of illustration, but only by the following claims in which we wish to claim all novelty insofar as the prior art permits.

We claim:

1. Composition of matter comprising a liquid solvent for pyroxylin containing 25 to 50% ketone of the formula $CH_3COR$, 20 to 40% of an acetate of the formula $CH_3COOR$ and 20 to 40% of an acetate of the formula $CH_3COOR'$ in which R is an alkyl group containing 3 to 5 carbon atoms and R' is an alkyl group containing one carbon atom more than R.

2. A composition of matter comprising a liquid solvent for pyroxylin containing 20 to 40% secondary butyl acetate, 20 to 40% secondary amyl acetate and 25 to 50% methyl butyl ketone.

3. Composition according to claim 2 containing 10 to 25% of a secondary or tertiary aliphatic alcohol of not more than 6 carbon atoms.

4. Composition according to claim 2 containing 10 to 25% of isopropanol.

5. A composition of matter comprising a liquid solvent for pyroxylin containing 20 to 40% secondary amyl acetate, 20 to 40% secondary hexyl acetate and 25 to 50% methyl amyl ketone.

6. Composition according to claim 5 containing 10 to 25% of a secondary or tertiary aliphatic alcohol of not more than 6 carbon atoms.

7. Composition according to claim 5 containing 10 to 25% of isopropanol.

8. A synthetic composition having substantially the boiling range, evaporation rate, and solvent power for pyroxylin exhibited by normal butyl acetate, said composition being formed of approximately 30% by volume of secondary butyl acetate, 30% by volume of secondary amyl acetate, and 40% by volume of methyl butyl ketone.

9. A composition comprising pyroxylin dissolved in a synthetic composition having substantially the boiling range, evaporation rate, and solvent power for pyroxylin exhibited by normal butyl acetate, said composition being formed of approximately 30% by volume of secondary butyl acetate, 30% by volume of secondary amyl acetate, and 40% by volume of methyl butyl ketone.

HARRY E. HOFMANN.
JAMES G. PARK.